July 29, 1969
E. R. McQUERRY ET AL
3,458,063
TUBE BUNDLE VEHICLE
Filed Jan. 31, 1967
2 Sheets-Sheet 1
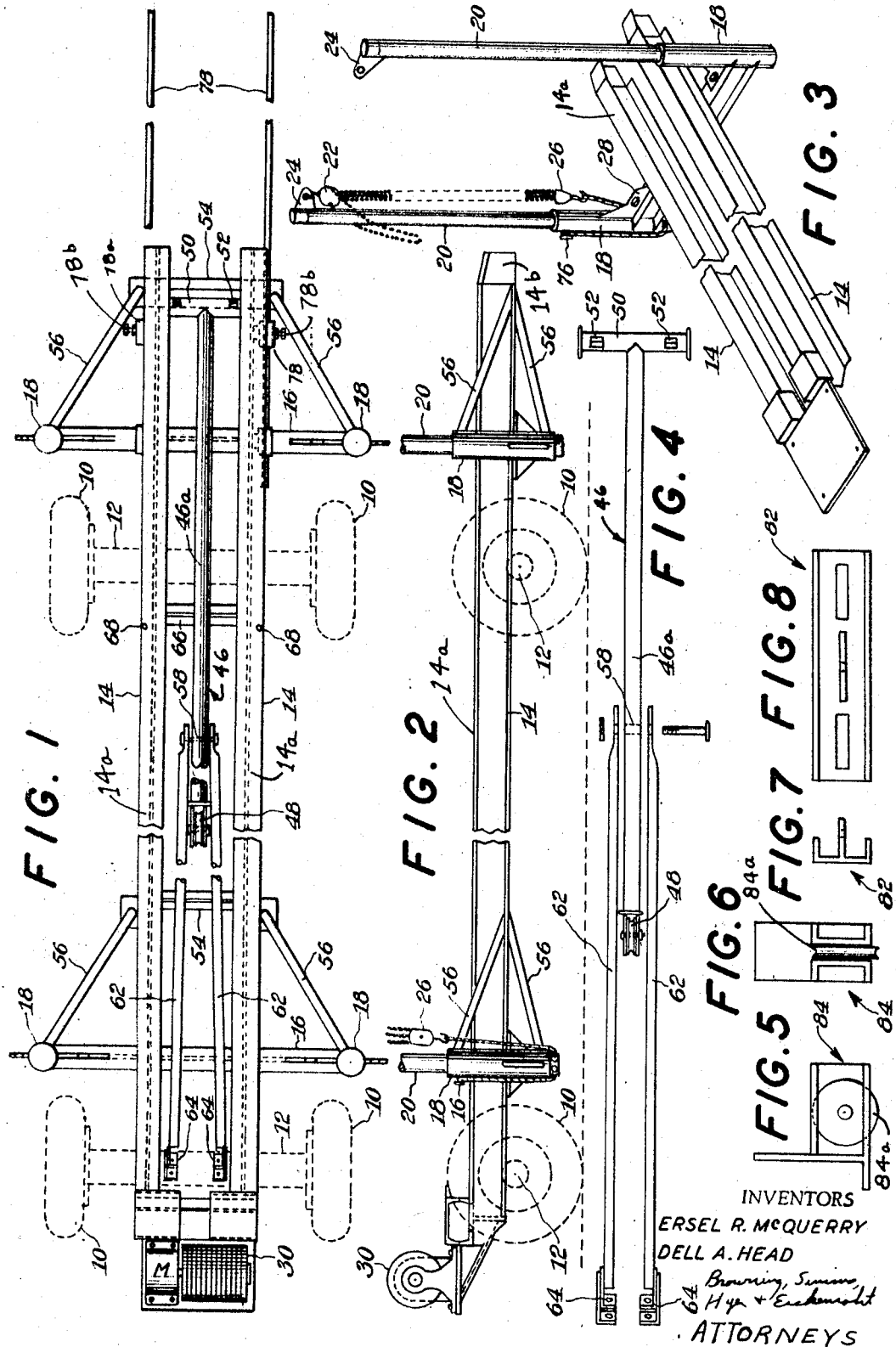
INVENTORS
ERSEL R. McQUERRY
DELL A. HEAD
ATTORNEYS

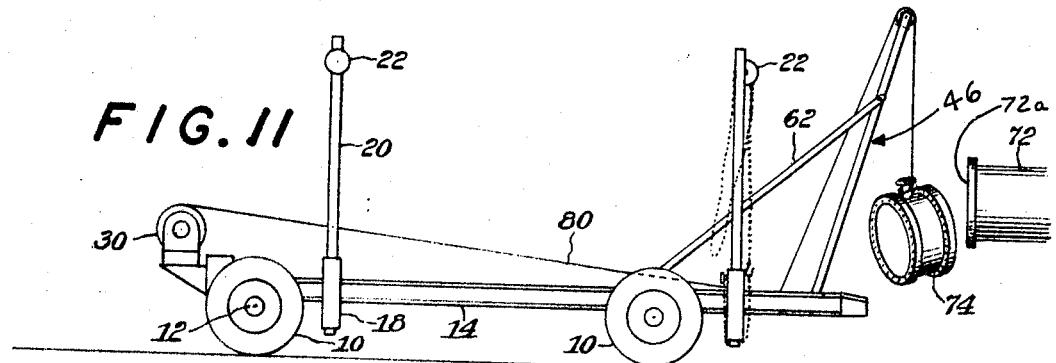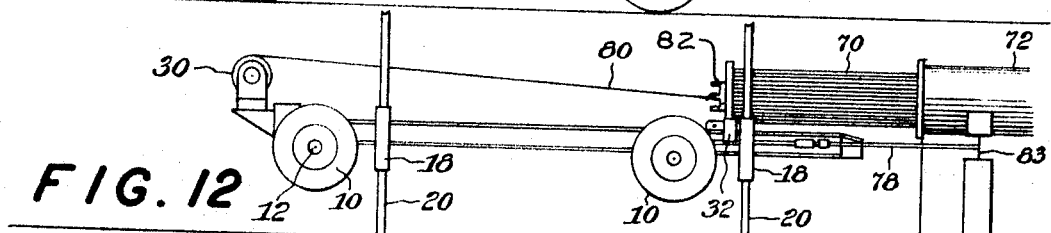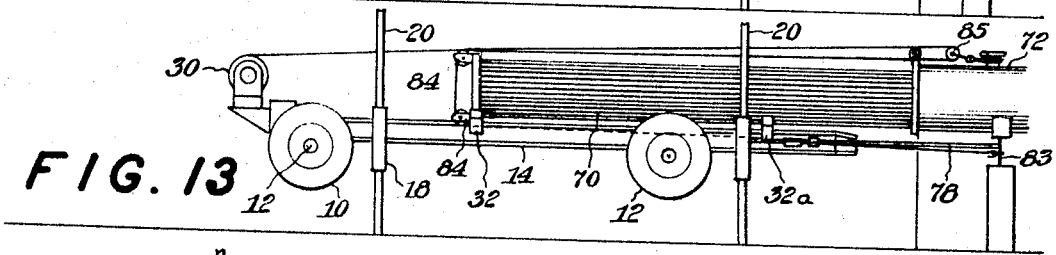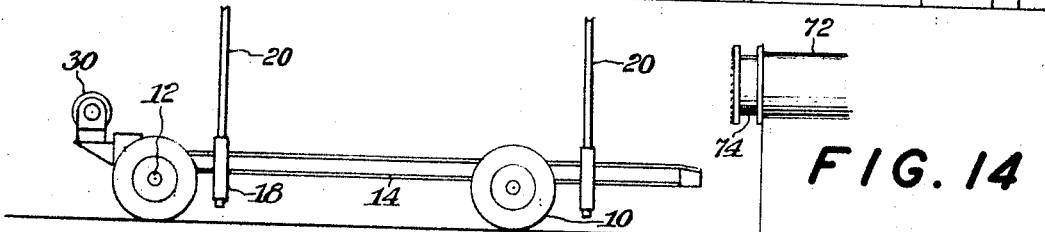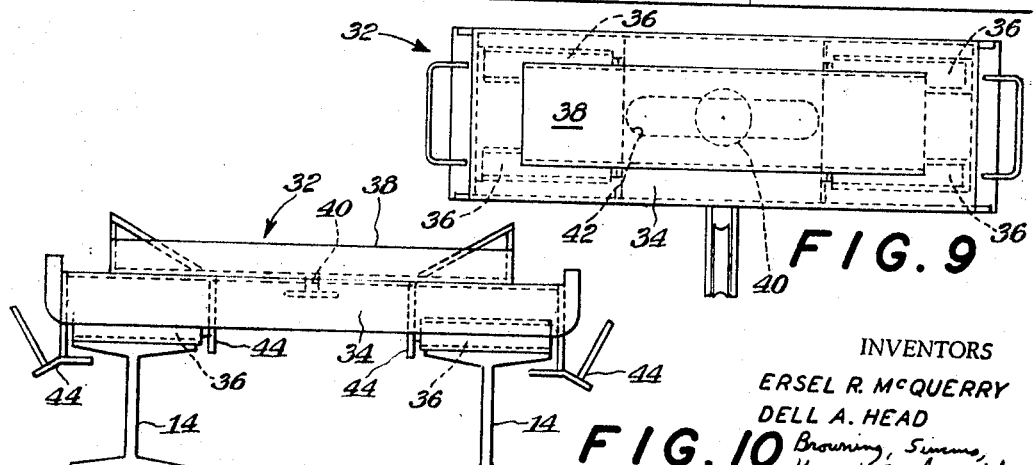

United States Patent Office 3,458,063
Patented July 29, 1969

3,458,063
TUBE BUNDLE VEHICLE
Ersel R. McQuerry, 1230 Lamar, and Dell A. Head, 1080 Lamar, both of Vidor, Tex. 77662
Filed Jan. 31, 1967, Ser. No. 612,954
Int. Cl. B65g 67/02; B25j 3/00
U.S. Cl. 214—38                    7 Claims

ABSTRACT OF THE DISCLOSURE

A tube bundle vehicle including a frame with a bed or track surface thereon, and wheels supporting the vehicle for transportation to and from a tube bundle housing, such as a heat exchanger shell. The vehicle bed is raised from and lowered to a position wherein the wheels engage the ground to and from a position aligning the track surface with an opening in the tube bundle housing, by legs movable vertically with respect to the frame. The frame is moved vertically with respect to the legs by a chain hoist. Also, a winch and cable is used to pull the tube bundle into and out of the housing. If the housing contains combustible gases, the winch may be driven by an explosion proof motor, such as an air motor. Also, a boom may be pivoted about the frame for supporting a block and tackle to assist in opening and closing the tube bundle housing.

---

This invention relates to a vehicle for transporting a tube bundle or the like to and from a housing, such as a heat exchanger, condenser, reboiler, for placement or removal of the tube bundle into and out of the housing.

There are many instances when the tube bundles utilized in heat exchangers must be removed therefrom and transported to a location remote from the heat exchanger. This is true, for example, where the heat exchanger contains highly combustible gases or fluids and the tube bundle must be removed for repairs which would require welding. In such a case, care must be taken in removing the bundle from the housing of the heat exchanger to prevent damage to the bundles and sparks caused by friction if the bundles rub excessively against a metal surface. Also, the ambient atmosphere around the heat exchanger may be contaminated with combustible gases and the means utilized in removing the tube bundle from the housing must be free from the generation of any sparks that are exposed to this atmosphere. After the bundle is removed from the housing of the heat exchanger it is then removed to a remote location where the repair work can be safely performed.

It is an object of this invention to provide a vehicle for transporting a tube bundle to and from a housing.

It is another object to provide such a vehicle which may be utilized in the placement in or removal of a tube bundle from the housing.

It is another object of this invention to provide such a vehicle which can be used in hazardous areas where combustible gas is in the atmosphere.

Another object of this invention is to provide such a vehicle wherein the risk of damage to the tube bundle while being placed in or removed from its housing is minimized.

A further object of this invention is to provide such a vehicle which, when used in the maintenance and repair of tube bundles, saves significant time and labor as compared to previously known apparatus.

Other objects, advantages, and features of this invention will become apparent in the course of the following description and with reference to the accompanying drawings illustrating a preferred embodiment of this invention, and wherein;

FIGURE 1 is a top plan view of the preferred embodiment of this invention;

FIGURE 2 is a side elevation view thereof;

FIGURE 3 is a fragmentary detailed perspective view showing the tracks and carriage which support the tube bundles and one set of support members for the track;

FIGURE 4 is a top plan view of a boom assembly which may be utilized with the preferred embodiment of this invention;

FIGURE 5 is a partical view in elevation of one arrangement for a pully adapted to be attached to an and of the tube bundle for supporting a cable for pulling the tube bundle into the heat exchanger housing;

FIGURE 6 is a side view of the pulley arrangement;

FIGURE 7 is a side view in elevation of a support bar adapted to be attached to an end of the tube bundle for pulling the tube bundle out of the heat exchanger housing;

FIGURE 8 is a front view of the bar;

FIGURE 9 is a top plan view of a carriage for supporting the tube bundles as they are moved along the track;

FIGURE 10 is a side view of the carriage shown in position over the tracks;

FIGURE 11 is a view in elevation showing the vehicle embodying the present invention in a portion where the boom may be used in preparing the heat exchanger housing for removal of the tube bundles therefrom;

FIGURE 12 is a view in elevation of the vehicle embodying the present invention shown in a position for and during removing the tube bundles from the housing;

FIGURE 13 is a view in elevation of the vehicle embodying the present invention shown in position for and during placing the tube bundles into the housing; and FIGURE 14 is a view in elevation of the vehicle embodying the present invention shown in its normal position for moving toward to away from the housing before removal of the tube bundle from the housing or after the tube bundle has been placed therein.

In accordance with this invention a vehicle is provided for transporting a tube bundle or the like to and from a housing, such as a heat exchanger, for placement or removal of the tube bundle into and out of the housing. The tube bundle is movable through an opening in the housing along a substantially straight line path. By using the vehicle of this invention the tube bundle may be moved from the housing onto the vehicle for transportation substantially along this straight line path. This is accomplished by providing a frame with means, such as wheels, for transportably supporting it to and from the housing. The frame includes a track upon which the tube bundle may be movable for placement into and out of the housing. The vehicle also includes a means for aligning the track along the straight line path of movement of a tube bundle in a position adjacent to the opening in the housing so that the tube bundle may be pulled onto the track without any substantial lateral or vertical movement from its elevation in the housing.

The vehicle of this invention may also include a means for moving the tube bundles into and out of the housing which means is engageable with the track and the tube bundle. This means may include a carriage supporting the tube bundle for movement along the track. Also, a means may be provided, such as a winch and cable, for exerting forces on the carriage and thus the tube bundle to move them along the track in a desired direction to place the tube bundle into the housing or to remove it therefrom.

In the preferred form of this invention the track is aligned in a position adjacent the opening in a housing by a plurality of legs and the track is movable from this position to a position to allow transportation of the vehicle. A means, such as a chain hoist, is provided for moving the track with respect to each of these legs between the said positions.

The vehicle may be used in gas hazardous locations and the winch, in such a case, may be powered by an explosion proof motor, such as an air motor or an electric motor in which any sparks generated are shielded from the ambient atmosphere.

Referring now to the drawings, in FIGURES 11–14 a housing, such as a heat exchanger 72, is shown with an opening 72a in an end thereof which may be closed by a cover or channel box 74. Disposed in heat exchanger 72 is a tube bundle 70 which is movable into and out of the opening 72a along a substantially straight line path of movement. It is the purpose of this invention to provide a vehicle which will aid in the placement or removal of this tube bundle. The vehicle is shown in the drawings as including a frame made up of parts such as bed beams 14, cross or out rigger beams 16, and support braces 54 and 56. The frame also includes a track which provides a surface upon which the tube bundle can lie and also be moved. In the form of this invention illustrated this track is shown as the top surfaces 14a of the bed beams 14.

A means is also provided for transportably supporting the frame to and from the housing. In the embodiment shown this means includes four wheels 10 mounted for rotation with respect to the frame on the two spaced apart axles 12. In this manner the tube bundles may be removed to and from the housing from a remote location where repair or other work can be performed on the tube bundles. The vehicle can be pushed or pulled between locations, such as by a tractor, or it can be self propelled. When the vehicle is in proximity to the housing and the tube bundles are to be placed into or be removed from the housing, the vehicle must be raised or lowered to an elevation permitting placement or removal of the tube bundle. For this purpose, a means is provided for aligning the track 14a with the opening 72a on a level therewith and stabilizing the vehicle at this position so that the removal and placement steps may be accomplished. The track surfaces 14a are so aligned that, as the tube bundle is removed from the housing along its path of movement, it may move onto and from the track substantially along this line of movement. In the embodiment illustrated in the drawings, this aligning means includes four legs 20 each vertically disposed and slidable in sleeves 18 at positions to support the vehicle frame in the position adjacent the opening 72a. The sleeves 18 are mounted vertically at the ends of the out rigger beams 16 and serve as guides and supports for the legs 18. The legs are held vertically off the ground by hold up pins 76 through the sleeves 18 and the legs. A means may also be provided for moving the track with respect to each of the legs from a position permitting transportation of the vehicle to and from the housing to a second position supporting the frame to align the track at a position adjacent said opening. As shown in FIGURE 3 this means may include a chain hoist 22, having hook 26, a lug 28 on each of the out rigger beams 18, and a lug 24 on each of the legs 20. The chain hoist 22 may be connected between each leg 20 and the frame by connection between the lugs 24 and 28 to move the frame relative to each leg 20, independently of the other legs, to provide the necessary alignment of the track surface 14a of the vehicle with respect to the housing 72.

The vehicle embodying this invention may also include a means engageable with the track and the tube bundle for supporting the tube bundle for movement along the track to and from the housing. In the embodiment shown this means includes a carriage member 32 slidable along the track surface 14a on rollers 36. The tube bundle is supported on the carriage for movement along the track such as by being placed on the surface 38 on top of the carriage 32. As shown in FIGURE 13 when the tube bundle is substantially out of the housing a second carriage 32a may be used to provide additional support for the tube bundle. The ends 14b of the bed beams 14 may be flared, as shown in FIGURE 2, to allow the carriages 32 and 32a to be rolled onto the surfaces 14a even though the tube bundle may extend partially over the vehicle, as shown in FIGURE 12.

In the embodiment shown in FIGURES 9 and 10, the carriage 32 has a bottom section 34 having two pairs of rollers 36, each of which rolls on one of the surfaces 14a of the bed beams 14. A top section 38 of the carriage rests on top of section 34 and has pin 40 riding in a slot 42 in the section 34. This pin and slot arrangement provides a means allowing for lateral movement of the surface 28 with respect to the carriage surface 34 for aiding in alignment of the bundle as it is removed or placed in the housing. Attached to the lower section 34 are guides 44 disposed on opposite sides of the rollers to prevent them from slipping off the surface 14a.

The carriage is caused to move above along the track by a means for exerting forces thereon to move it in a desired direction. Such a means is shown in FIGURES 1 and 2 as winch 30 and a cable 80 adapted to be wound and unwound on the winch. When the bundle is to be pulled out of the heat exchanger 72, a bar 82 of suitable construction is attached to the exposed end of the tube bundle, as shown in FIGURE 12 to provide a suitable means for connection between the tube bundle and the cable 80. The cable 80 is then connected to bar 82 and wound onto the spool of the winch 30, pulling the bundle onto the track. The bar 82, shown in detail in FIGURES 7 and 8, may be made of various lengths to accommodate various sized bundles.

When the bundle 70 is pulled into the housing 72 from the bundle wagon, two blocks 84 including pulleys 84a (shown in FIGURES 5 and 6) are attached to the end of the bundle 70 as shown in FIGURE 13 so that the cable 80 is strung over the pulleys and secured at or near the housing end of the frame. In this manner, the tube bundle 70 will be pulled into the heat exchanger as the cable 80 is wound onto the spool of the winch 30.

The winch 30 may be powered such as by an explosion proof motor M which may be an air motor or an electric motor shielded so that any sparks generated are not exposed to the ambient atmosphere. Thus, if the heat exchanger contains combustible gas, danger of explosion would be minimized.

In order to further insure that the vehicle is rigidly stabilized adjacent the heat exchanger housing 72 when the tube bundle 70 is removed therefrom or placed therein, at least one rigid support member may be connected between the vehicle and the housing. In the drawings, this member is shown as the bars 78 connected to the foundation 83 of the housing 72 as shown in FIGURES 12 and 13. The bars 78 are slidably attached to the beams 14 so that they may extend varying lengths from the end of the vehicle frame. The bars 78 are mounted in cylindrical sleeves 78a and secured in place by a lock bolt 78b.

In order to facilitate the handling of the removal of the tube bundles from the housing, the vehicle may further include a boom supporting a block and tackle for hoisting large objects. As shown in FIGURE 1, a boom 46 is pivoted about the frame from a position below the vertical elevation of the track to an upright position. The boom 46 includes a boom pole 46a having a pulley 48 at one end and secured to the center of a short transverse cylinder 50 at its other end. The cylinder 50 is rotatably secured to one of the two frame members 54, and its rotation about this member is limited, such as by stops 52 on the cylinder which jam against the frame. At a point 58, intermediate the ends of the pole 46a, the pole is pivotally secured to the ends of two oppositely disposed elongated boom supports 62. Each of the boom supports 62 includes a flange 64 at its other end. When the boom is not in operation the pole 46a and the supports 62 lie flat within the frame and below the elevation of the track surface 14a. However, the pole can be raised until the flanges 64 are approximately at the intermediate frame member 66 extending transversely between and secured to beams 14 intermediate the frame members 54. Holes 68 are provided in the beams 14 at this point and pins can be dropped through holes 68 to secure and stabilize the boom.

In operation, the tube bundle vehicle embodying this invention is transported to a position near a heat exchanger in which the tube bundles are to be removed for repair or other disposition, for example, it may be used to remove tube bundle 70 from a heat exchanger housing 72. The boom pole 46 is raised and locked in its raised position, where it then can be used to let down the front cover 74 of the exchanger. The boom is then folded back to flat position after such use.

The bundle vehicle can now be positioned so that the track can be raised to a position adjacent the opening 72a of the exchanger 72 and in alignment and on the same level therewith.

In aligning and stabilizing the vehicle at the aforesaid position, the hold up pins 76 on the four legs 20 are pulled letting the legs come to the ground. The four chain hoists 22 are now attached to the lugs 28 on the leg guides 18 on the legs. The complete wagon is then raised to the proper height to align the track surface 14a in line with the line of movement of the bundle 70 as it moves out of the housing by operating the chain hoist to move the frame vertically. The two bars 78 are slipped back against the exchanger foundation and locked. This prevents pulling the wagon back instead of pulling the bundle out. Also the bar 82 is attached to the exposed ends of the tube bundle and the cable 80 is then attached to the bar 82 and the bundle pulled out until the exposed end is over the bed beams. The front carriage 32 is then rolled under the front of the tube bundle. The chain hoists are raised until the wagon is carrying the projected weight of the bundle. The bundle is then pulled until it is nearly out of the shell, the back carriage 32a is now put out on the bed beams under the bundle and the vehicle raised until the entire weight of the bundle is on the wagon and the bundle is finally pulled all the way out and onto the wagon resting on the two carriages 32 and 32a on the tracks 14a. The wagon carrying the bundle is then lowered to the ground by operating the chain hoist so that the four legs are raised and pinned in a travel position. The wagon with bundle can now be pulled away.

The procedure for loading the tube bundle back into the housing from the vehicle is substantially the reverse of the above described procedure.

From the foregoing, it will be seen that this invention is one well adapted to attain all of the ends and objects hereinabove set forth together with other advantages which are obvious and which are inherent to the apparatus and structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An integral vehicle for transporting a tube bundle or the like to and from a housing for placement or removal of the tube bundle into and out of the housing, where the tube bundle is movable through an opening in the housing along a substantially straight line path, comprising, in combination, a frame; a plurality of ground engaging wheels mounted for rotation with respect to said frame to support the vehicle for transportation to and from the housing; a track carried on said frame; at least one carriage movable along said track for supporting a tube bundle for movement along said track; a plurality of adjustable rigid legs mounted on said frame for independently adjusting and rigidly supporting the respective ends and sides of said track at different vertical elevations to place said track adjacent to said opening in the housing and in substantial alignment with said path to allow substantially straight line movement of said tube bundle out of said housing and onto said carriage; a standoff brace on said frame engageable with said housing for maintaining desired spacing between said frame and said housing during movement of the bundle between the housing and carriage; and means for moving said tube bundle along said track and to and from said housing.

2. The vehicle of claim 1 wherein the length of said standoff brace is adjustable to allow adjustment in the horizontal positioning of said frame with respect to said housing.

3. The vehicle of claim 1 wherein there is means on said carriage for supporting the tube bundle and providing lateral movement of the tube bundle when supported thereon, said lateral movement being with respect to the length of said frame so that the tube bundle follows said straight line path when being moved to or from said housing despite misalignment of said track with said path.

4. The vehicle of claim 1 further including a boom pivoted about the frame from a position below the elevation of the track to an upright position.

5. The vehicle of claim 1 wherein said track and carriage have interlocking flanges preventing said carriage from vertical or lateral movement out of engagement with said track.

6. The vehicle of claim 5 wherein said flanges on the track terminate at the end thereof adapted to first receive the tube bundle to permit said carriage to be placed on and removed from said track at such end.

7. The vehicle of claim 3 wherein said track and carriage have interlocking flanges preventing said carriage from vertical or lateral movement out of engagement with said track.

References Cited
UNITED STATES PATENTS

| | | |
|---|---|---|
| 2,831,588 | 4/1958 | Seed. |
| 3,239,076 | 3/1966 | Huff et al. _____ 214—1 |
| 3,239,077 | 3/1966 | Huff et al. _____ 214—1 |

ROBERT G. SHERIDAN, Primary Examiner

U.S. Cl. X.R.

214—1